Jan. 7, 1958  R. D. CLEMSON  2,818,699
POWER STEERING CONTROL MECHANISM FOR LAWN MOWERS
Filed May 18, 1953  7 Sheets-Sheet 1
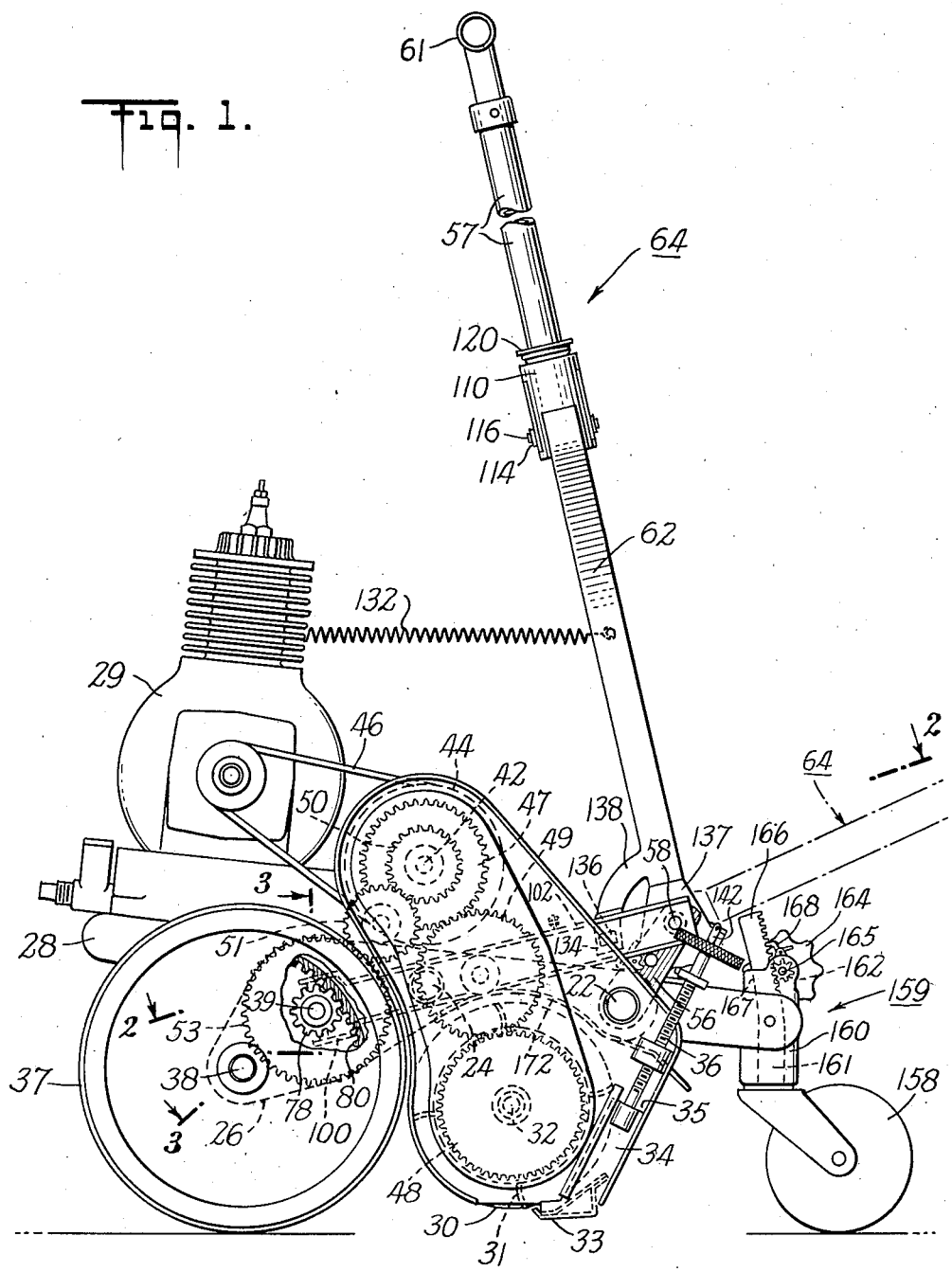
INVENTOR
Richard D. Clemson
BY
Curtis, Morris & Safford
ATTORNEYS

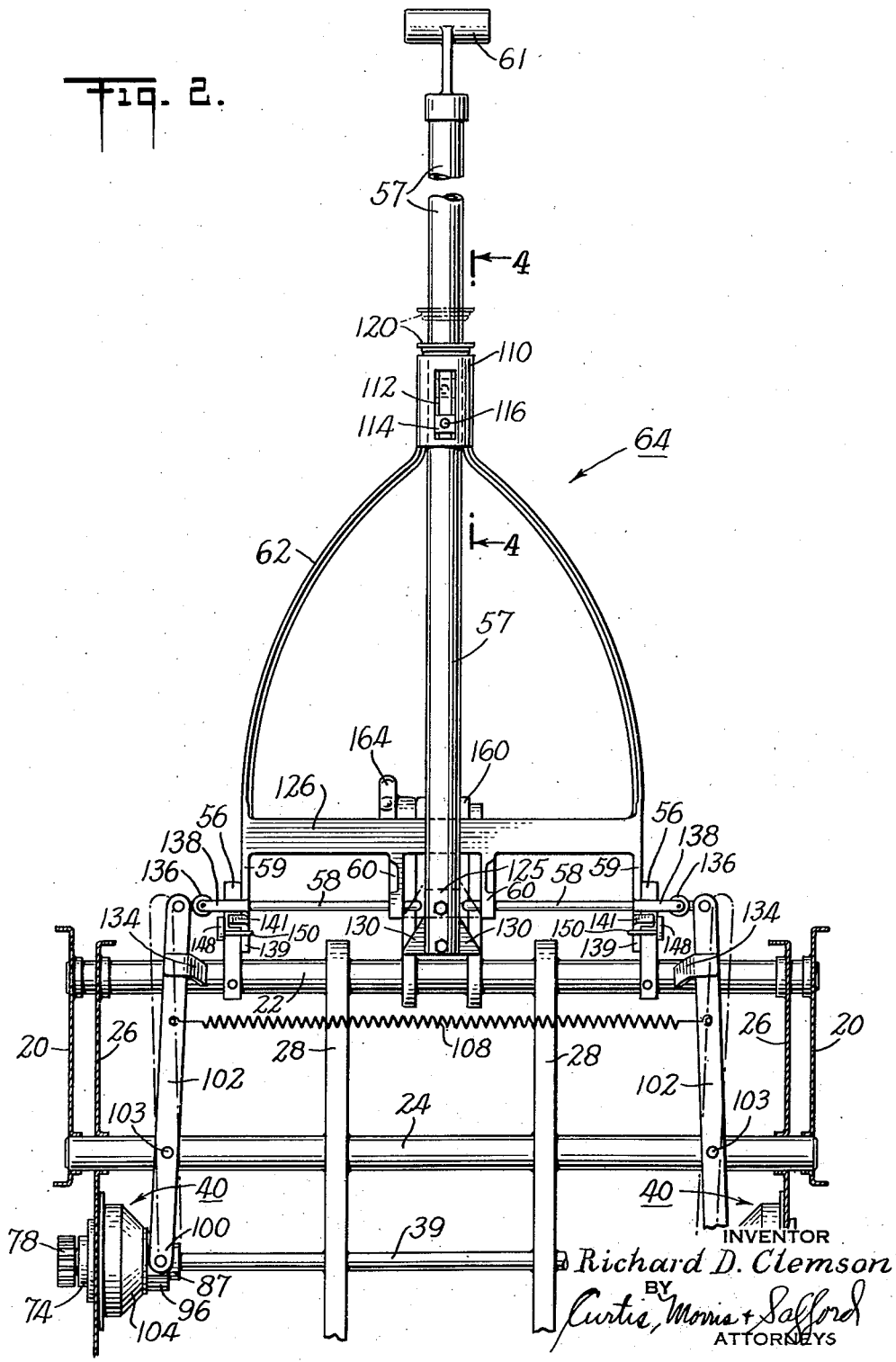

Jan. 7, 1958 R. D. CLEMSON 2,818,699
POWER STEERING CONTROL MECHANISM FOR LAWN MOWERS
Filed May 18, 1953 7 Sheets-Sheet 3
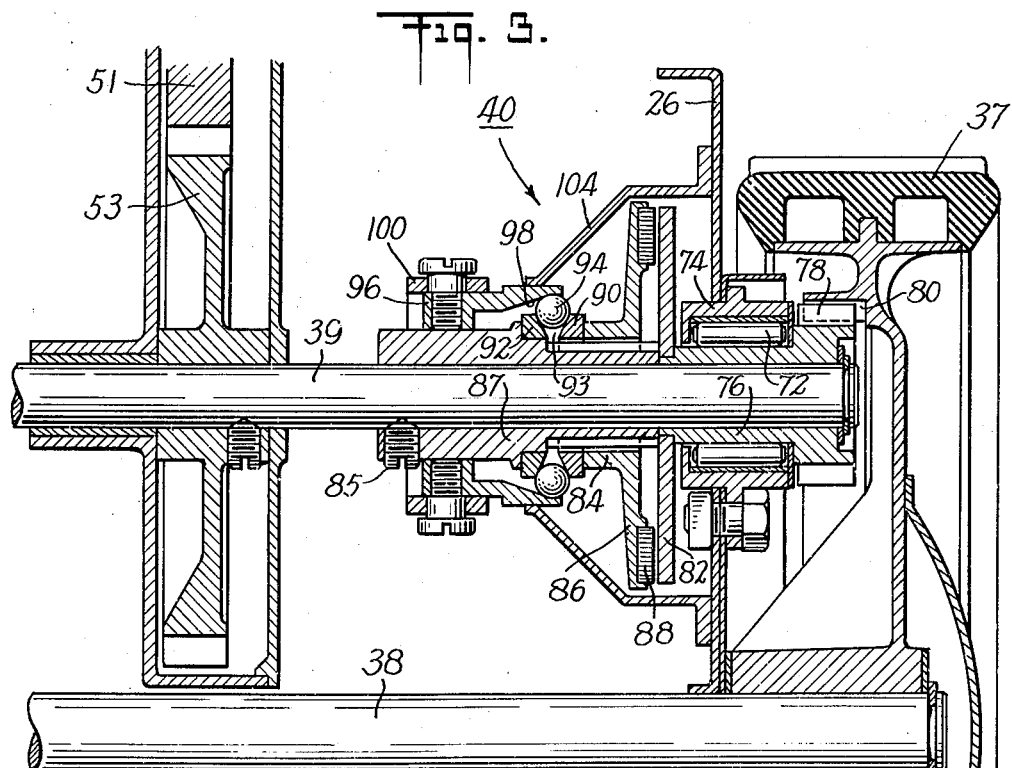
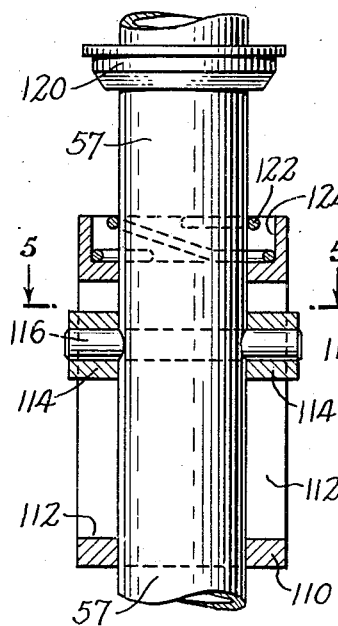
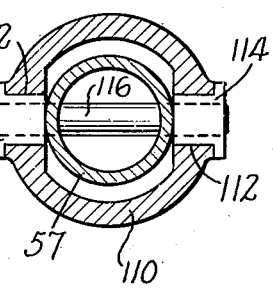
INVENTOR
Richard D. Clemson
BY
Curtis, Morris + Safford
ATTORNEYS

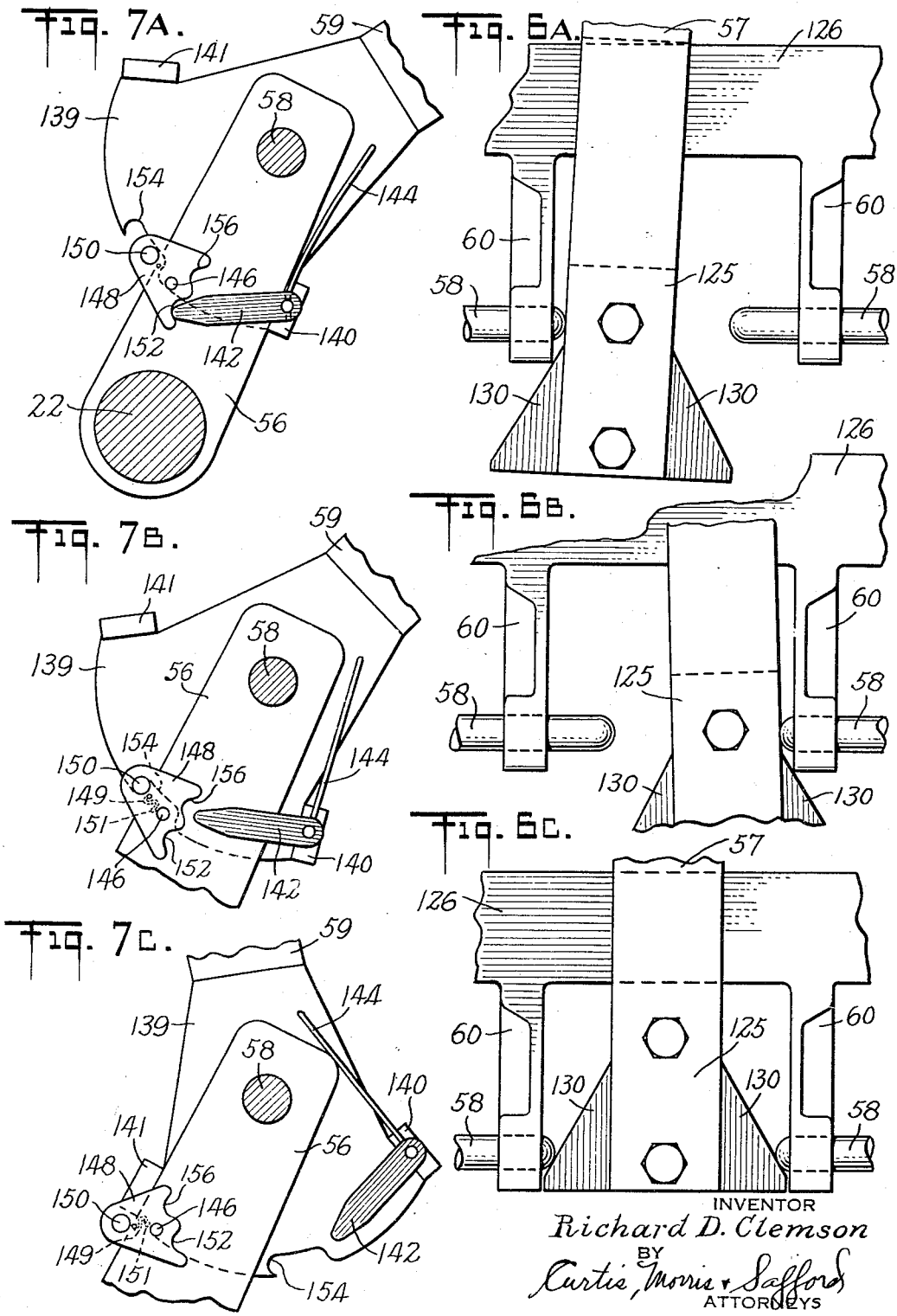

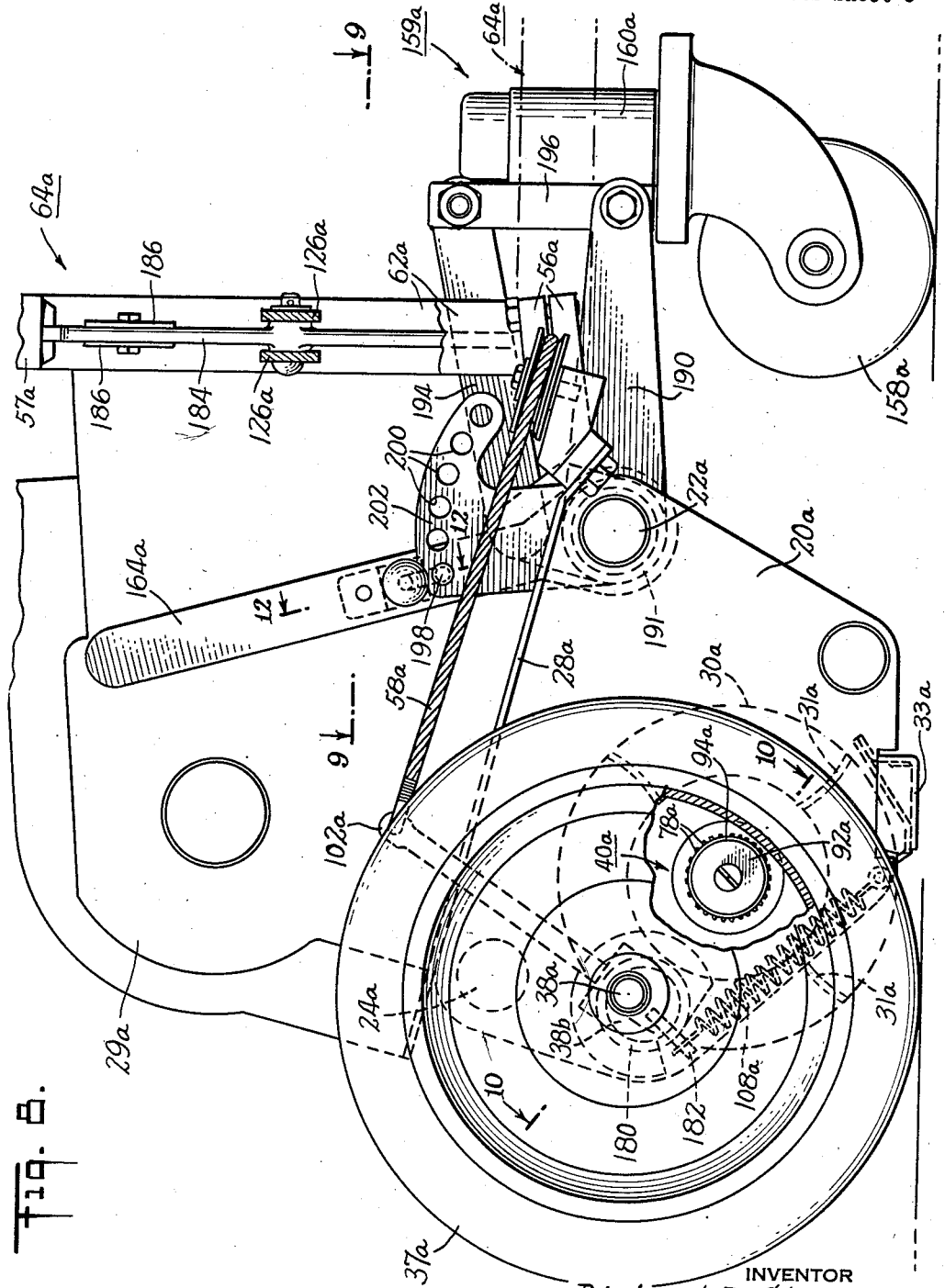

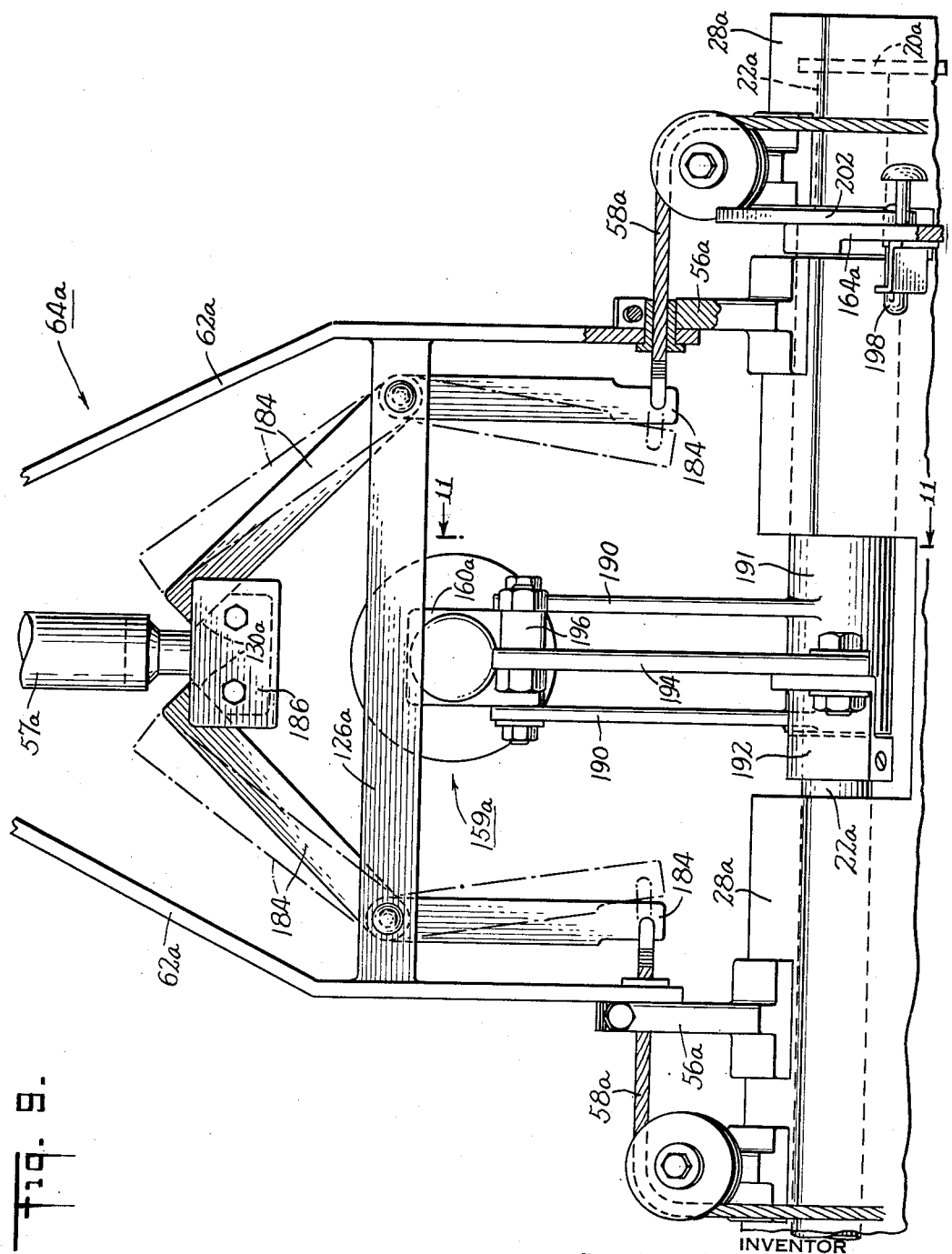

Jan. 7, 1958     R. D. CLEMSON     2,818,699
POWER STEERING CONTROL MECHANISM FOR LAWN MOWERS
Filed May 18, 1953     7 Sheets-Sheet 7
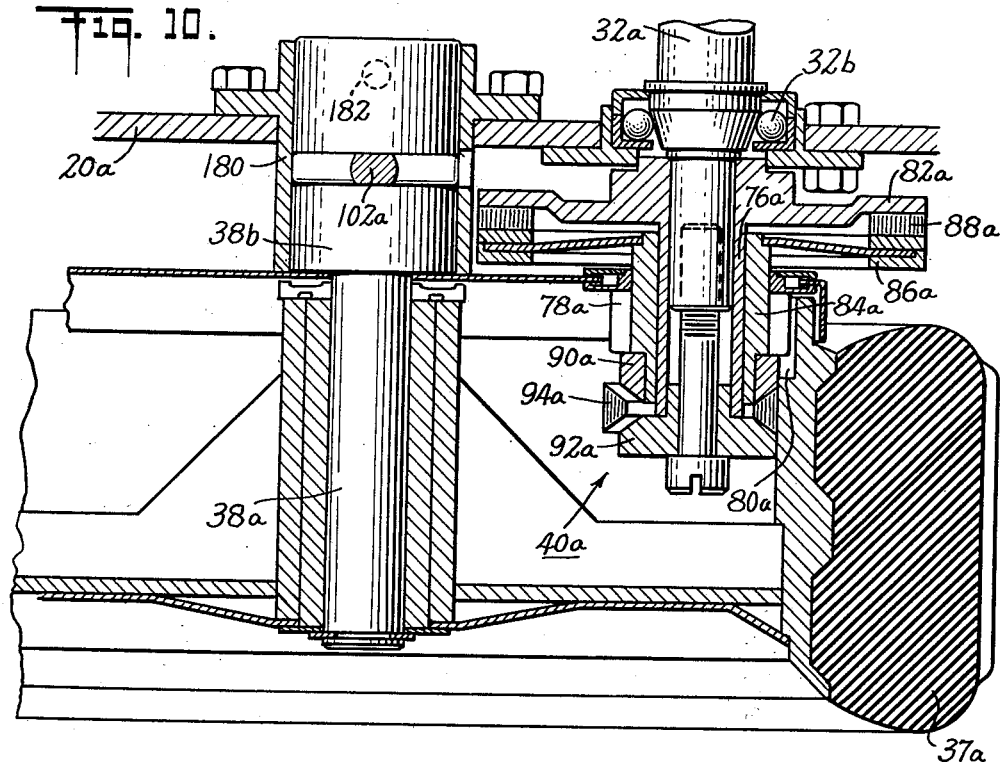
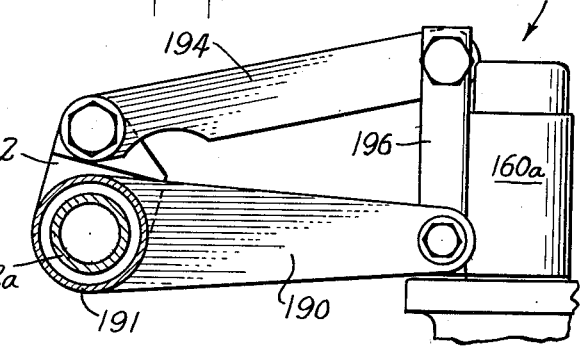
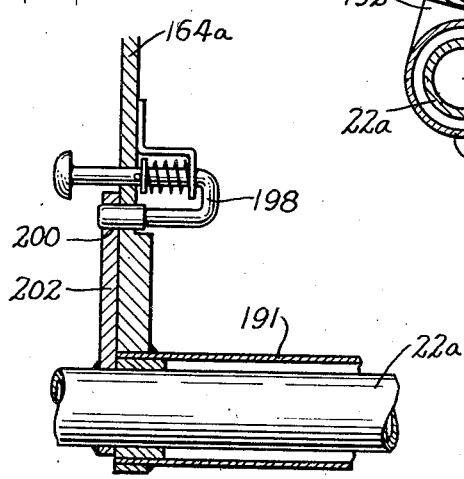
INVENTOR
Richard D. Clemson
BY
Curtis, Morris + Safford
ATTORNEYS

United States Patent Office 2,818,699
Patented Jan. 7, 1958

2,818,699

POWER STEERING CONTROL MECHANISM FOR LAWN MOWERS

Richard D. Clemson, Middletown, N. Y., assignor to Clemson Bros. Inc., Middletown, N. Y.

Application May 18, 1953, Serial No. 355,524

19 Claims. (Cl. 56—26)

This invention relates to power lawn mowers, and particularly to power mowers for home and park use; and to steering and adjusting devices therefor.

Power lawn mowers for such use have generally comprised a motor mounted on a conventional lawn mower and connected to the cutter reel, or other cutting mechanism, and also connected through a clutch to the ground wheels. Over-running clutches or differential gears have been used on the better mowers to allow for different wheel speeds when turning. A throttle, together with some form of clutch control for disconnecting the power drive, are usually mounted on the handle.

As is well known, power mowers of this type are difficult to operate and steer around obstructions, borders, etc., and tend to drive the operator at an abnormal pace which is often very tiring. Steering of such a mower on a turn requires the operator to race around the mower on an arc, of necessarily long radius because of the length of handle, or to tip the whole mower back on its ground roller and to work it back and forth gaining a little turn at each movement. Even when driven by a skilled operator it is not unusual to damage the lawn in the turning process.

It is generally accepted that power mowers are too cumbersome for close trimming around trees, flower beds, buildings, etc. Thus a considerable amount of hand mowing is normally required on any lawn.

Applicant, according to this invention provides a power mower with a novel driving control which is extremely easy to handle in such a way as to keep the lawn healthy and well groomed, without need for use of a hand mower.

It is accordingly a primary object of the present invention to provide a power lawn mower that is highly responsive requiring little physical effort and allowing the operator to choose his own gait.

A more specific object of the present invention is to provide a power mower with highly responsive power steering. Another object is to provide a power mower that is extremely maneuverable and that will readily cut around and close to obstacles such as trees, foundations, walks, flower beds, etc.

It is another object of the present invention to provide a power mower that will automatically come to a stop whenever it is released by the operator.

Another object is to improve rigidity and reduce weight of power lawn mowers. Another object is to provide simplicity in operation and adjustment. It is a further object of the present invention to provide a power mower with a minimum drag on turns.

Other and further objects will be in part apparent and in part pointed out as the specification proceeds.

In the drawings:

Figure 1 is a side elevation of a mower embodying the principles of the present invention;

Figure 2 is a top plan view of the frame and handle structures, along line 2—2 of Figure 1, with the control column in the lowered position shown in dotted lines in Figure 1;

Figure 3 is an enlarged sectional view on line 3—3 of Figure 1;

Figure 4 is an enlarged view of a portion of the control handle of Figure 2 with the collar shown in axial section;

Figure 5 is a cross-sectional view on the line 5—5 of Figure 4;

Figures 6(A) through (C) are enlarged fragmentary views of the lower end of the control column showing three different positions of operation thereof;

Figures 7(A) through (C) are enlarged fragmentary views of a mower-lifting mechanism;

Figure 8 is a view similar to Figure 1, partially broken away for clarity, showing another form of the present invention;

Figure 9 is a plan view substantially on the line 9—9 of Figure 8 with the control column in its lower position;

Figure 10 is an enlarged sectional view on the line 10—10 of Figure 8;

Figure 11 is a sectional view taken on line 11—11 of Figure 9;

Figure 12 is a sectional view taken on line 12—12 of Figure 8.

Referring now to Figures 1 and 2 an outer frame has a pair of outer frame members 20 rigidly fixed to a pair of tie tubes 22 and 24 by welding, for instance. A pair of inner frame members 26 are similarly fixed to said tie tubes, and a pair of motor mounts 28, also fixed to said tie tubes, carry the driving motor 29. Mounted within the frames 20 is the bed knife 33 and the reel 30 with the cooperating fly knives 31 and reel shaft 32. The bed knife is adjustable by blocks 34 slidable in channels 35 on the outer frame members 20. A differential screw 36 serves for adjusting the pressure of the bed knife 33 against the reel 30.

Ground wheels 37 are mounted on axles 38 secured in the inner frames 26 forwardly of said reel.

A drive shaft 39 between the inner frames 26 drives wheels 37, each through a clutch 40 at one end thereof. Thus, power transmitted from the shaft 39 through drive pinion 78 and ring gear 80 may be engaged with wheel 37 by clutch structure 40.

A pulley 44 keyed on one end of jack shaft 42 drives it from the motor 29 through belt 46. A gear 47 on the other end of the jack shaft 42 drives reel 30 through gear 48 thereon and idler gear 49 (all shown in dotted lines in Figure 1). A gear 50 (shown in dotted lines in Figure 1) drives shaft 39 from jack shaft 42 through gears 51 and 53.

A control column 64 consists of a central shaft 57, a handle 61 at its outer end, and a yoke 62, made up of tines 59 and 60 pivoted on push rods 58 extending into brackets 56.

Figure 3 shows in section detail of the clutch structure 40 and its driving relationship with its associated ground wheel 37.

A roller bearing 72 in cup 74 bolted on inner frame 26 supports the power shaft 39 through the freely rotatable sleeve 76 of drive pinion 78, which is rotatably mounted on shaft 39. Fixed to the other end of sleeve 76 is a clutch plate 82. A second plate 86 having a splined hub 84 is mounted on an externally splined hollow shaft 87 telescoped onto shaft 39 adjacent sleeve 76. Shaft 87 is keyed to shaft 39 by set screw 85. Thus clutch plate 86 is keyed to rotate with said sleeve and shaft, but is free to move longitudinally on the splined portion of shaft 87.

Clutch plate 86 has about its periphery a friction lining 88 which is adapted to engage clutch plate 82 to drive pinion gear 78.

At the opposite end of hub 84 from clutch plate 86 is an annular conical bearing ring 90 positioned to cooperate with a corresponding conical bearing ring 92 on hollow shaft 87. Adjacent faces of these rings diverge outwardly forming an annular V-shaped ball-race 93. A plurality of ball bearings 94 are distributed around this race and held therein by collar 96 which has a conical inner surface 98 which in the position shown loosely retains the ball bearings 94 and when pushed toward the end of the shaft cams them into the race 93 and thereby wedges apart the rings 90 and 92 to force clutch plate 86 against friction plate 82. Thus the pinion 78, ring gear 80 and the ground wheel 37 are driven from shaft 39. The slopes of the conical faces at 93 and of conical face 98 may be chosen to given any desired mechanical advantage for easy clutching.

A yoke 100 on a lever 102 is connected to the collar 96. This lever is pivoted at 103 on tie tube 24 and connected at its other end to push rod 58.

A cover 104 encloses the whole assembly.

A corresponding clutch 40 is disposed at the other end of power shaft 39 to drive the other ground wheel 37 as described above. A spring 108 connected between the clutch actuating levers 102 pulls the clutches to the engaged position.

Referring now to Figures 2, 4 and 5, the control column 64 is mounted in a collar 110 carried at the upper end of yoke 62. This collar 110 has an internal diameter larger than the diameter of the control column 64 (see Fig. 5) thus allowing considerable swinging of the column on the pivot 116. Pivot bearings 114 mounted on opposite ends of the pivot pin 116 are slidable longitudinally of the column in slots 112 in collar 110.

The handle 61 at the upper end of the control column 64 may thus be swung from left to right to engage and move the left-hand push rod 58 and thereby to disengage the left hand clutch 40; and vice versa. If the handle is pulled axially through the collar 110 both clutches 40 disengage. If the handle is pushed in its centered position (or allowed to move down by action of spring 108) both clutches are engaged.

A stop ring 120 mounted on control column 64 engages a spring 122 when the column 64 is dropped, and thus provides a cushioned stop against the bottom of recess 124.

The shaft 57 of the control column 64 is slit and flattened to make a bifurcated lower end 125, and the transverse strut 126 of yoke 62 is fitted in the bifurcation. This guides and limits the movement of column 64 and reinforces it.

A cam block 130 is bolted into the bifurcation at the lower end of the shaft 57, which operates the push rods 58 against the force of spring 108.

With the control column centered laterally in operating position (in this case between 15° and 75° above horizontal) both the clutches 40 are engaged to drive both wheels. Within this operating range the clutches may be disengaged simultaneously by pulling or selectively by swinging, the control column 64, e. g., by its handle 61. Two or three pounds is normally sufficient for this operation.

To turn the mower, the handle 61 is swung just as one normally would if he were pushing the mower. As the shaft 57 swings about pivot 116, its lower end 125 swings in the opposite direction and the upper part of block 130 engages one of the push rods 58 (Figs. 6A or 6B). These push rods 58 are axially slidable in brackets 56 to actuate clutches 40, respectively.

When the control column is moved from its centered position shown in Fig. 2 to the position shown in Figure 6A, the push rod 58 is driven outward, actuating lever 102 to its position shown in dotted lines in Fig. 2. This movement disengages the corresponding clutch 40. The other clutch is meanwhile left engaged to drive ground wheel 37, which causes the driven wheel to circle about the released wheel, and thus to turn the mower. Caster wheel 158, described below, facilitates such turning.

Fig. 6C shows the action used to stop the mower. A backward pull on the handle 61 draws the central shaft 57 of control column 64 upward through the collar 110 of yoke 62 until both cam surfaces 130 actuate push rods 58 to disengage both clutches.

A safety interlock feature on the control column automatically disengages both clutches when the handle is released. As shown in Fig. 1, a spring 132 stretched between the control column and the motor frame pulls the control column into the upright position. Cam tracks 134 welded on clutch levers 102 lie in the paths of rollers 136 mounted on fingers 138 on tines 59; so that when the control column is swung upward these rollers cam outward the levers 102 releasing both clutches 40.

In the embodiment shown the rotation of the reel is independent of the rotation of the wheels and of the operation of clutches 40. This is illustrative of a variety of cutter operating arrangements which can be used. My invention in its broader aspect is not limited to any one of these—nor even to any particular type.

The end 139 of each tine 59 on yoke 62 (see Figs. 7A, B, and C) is broadened and provided with inturned projections 140 and 141, which engage the post 56 to serve as stops to limit swinging of the control column.

A further mechanism shown in Figs. 7A, B, and C, provides for lifting of the mower over obstacles or over edges of flower beds, etc. Pawl 142 is pivotally mounted on one side of the end portion 139 and provided with a spring tail 144 urging the pawl substantially to the position shown in Fig. 7B. On the opposite side of post 56 from the pawl is latch 148 pivotally mounted on stud 146. This latch 148 is biased to one stop or the other by toggle spring 149 engaging the latch in a hole beside stud 150 and engaging post 56 in notch 151. Spring 149 is an S-shaped wire with its ends stressed inward so that it acts in compression, tending to push the latch to whichever side it is turned until pin 150 is stopped on the edge of post 56. As the spring is a shorter radius from slot 151 than the radius on which the outer end of spring 149 swings about pivot 146, its maximum compression occurs at dead center, where both radii are aligned; and, as the latch swings through this position, the spring which has been pushing to one side toggles over to push toward the other side.

When it is desired to support or lift the cutting mechanism above the position which it would normally maintain, the control column may be latched to the mower frame by lowering to its bottom limit (Fig. 7A). During this lowering the pawl 142 engages latch member 148 in its recess 152, which is circumferentially aligned with the pawl. As the control column moves farther toward its lower limit, the latch 148 is pushed over dead center to its opposite position. This is illustrated for example by the movement from the position shown in Fig. 7C to that of Fig. 7A.

In this latter position of Fig. 7A, stud 150 is pushed into a notch 154 in the end 139; and when the control column is lifted, the stud 150, latches into notch 154 (Fig. 7B).

Further lifting of the control column 64 will now lift the whole mower about the ground wheels. Thus the bed knife may be lifted to clear an obstacle or to compensate for one driving wheel being in a gully or in a flower bed, and the grass may be cut as with a conventional type mower.

In the engaged position of Fig. 7B the pawl 142 has been returned to its centered position by its spring tail 144; and the upper recess 156 aligned circumferentially with pawl 142. Thus, when it is desired to unlock the control column, it is only necessary to lower the column again to its bottom limit, whereby the pawl 142 acting against recess 156 swings the latch 148 upward, and its stud 150 out of the notch 154, back into the position shown in Fig. 7C.

When the control column is lifted again the notch 154 clears the pin 150 permitting free swinging of the control column between the limits set by stops 141 and 142.

In normal operation the height of the bed knife or other cutting device is maintained by a ground roller. In this case the ground roller is a caster 158 connected to the frame through an adjustable mounting 159, by which it may be easily and quickly adjusted to vary the height of cut of the mower. This adjustable mounting comprises a bracket secured on the motor mounts 28, a caster bearing 160 for the caster pin 161, and a rack and pinion assembly 162—6. The arcuate gear rack 166 is rigidly secured to the bearing cup 160; and its arc is centered at the axis of the ground wheels and is tangent to the axis of caster pin 161 (or a parallel thereto) at a height above the ground equal to the radius of wheels 37. The pinion 162 and hand wheel 164 are keyed on a stub shaft 165 rotatably mounted in the caster bearing 160. Rack 166 is fitted in an arcuate bearing slide 167 on the side of caster bearing 160, and a ratchet pawl 168 on 166 locks the gear rack in a given position. When locking pawl 168 is released and wheel 164 turned, pinion 162 lowers rack 166 relative to the caster mounting 159 and thus lowers the rear of the mower, to which it is secured.

The use of the arcuate slide, whether gear rack or other adjusting device, insures that, regardless of the height of cut adjustment, the pivot axis of the caster 158 will remain substantially vertical; so that there will be no tendency of the caster to be turned to either side by the weight of the mower.

A guard plate 172 (Fig. 1) carried by frame members 26 prevents cut grass from flying up into the other parts of the mower. The rear edge of this guard is bent downwardly at approximately a 45° angle from the horizontal to deflect downwardly the cut grasses thrown back by the reel. This prevents "wind rowing" normally encountered with reel type mowers.

There is thus provided a novel power mower of an improved and simplified construction the operation of which is so normal and obvious that it may be easily and readily controlled by a novice having no special skill or strength.

When the drive for the ground wheels is independent of the reel drive, as above described, the ground wheels are free to roll in either direction at whatever speed is most convenient without affecting the efficiency of the cutting mechanism. The automatic clutches and central column assure power drive of the ground wheels at just the right speed to follow the operator without dragging or tugging ahead or to either side. The positive drive to both wheels assures straight line operation when the mower is not being steered. Furthermorne, the provision for automatic de-clutching when the control column is released is an important safety feature. By combining the power steering and manual clutch control features in the single control column, the mower may be easily operated in tight places and can cut very close to trees, curbs and other obstacles.

Turning now to Figures 8 through 10, there is shown another embodiment of the present invention with corresponding parts indicated by corresponding numerals.

In this embodiment the frame members 20a are welded or otherwise rigidly secured to each end of the tie tubes 22a and 24a and, at the bottom edge thereof, to the bed knife assembly 33a. Frames 20a carry a plate 28a which serves as the motor mount for the motor assembly 29a. Caster 158a is mounted on an adjustable mount 159a which, like the mounting 159, keeps the axis of swivelling vertical at all times.

The cutter reel is mounted in bearings 32b secured in the end frames 20a. The reel shaft 32a is driven by the motor 29a through any suitable belt, chain or gear drive assembly (not shown) e. g., as in Fig. 1. The ground wheels 37a are mounted on axles 38a which are carried on eccentric bearings 180 fixed in the frames 20a (Fig. 10).

Operating levers 102a are fixed to the eccentric shaft 38b mounted in fixed bearings 180 (see Fig. 10) and extend upwardly from the bearings 180 and are connected at their ends to cables 58a, the other ends of which connect to the control column 64a through bell cranks 184.

Clutch springs 108a are stretched between the frames 20a and pins 182 diametrically opposite levers 102a on shaft 38b. When cables 58a are relaxed these springs serve to engage the clutches by rotating the shafts 38b to engage the clutch mechanism (described below).

The drive mechanism for each ground wheel includes the usual ring gear in the wheel 37a (see Fig. 10) and a pinion gear on the reel shaft 32a, a clutch assembly and sprocket chain or belt 51a driven from a sprocket on a jack shaft which is driven by a belt and pulleys similarly to Figures 1 and 2 (not shown in Fig. 8 or 10 to avoid confusion).

The clutch 40a includes a friction plate 82a fixed on reel shaft 32a and to drive sprocket 53a. This is engaged by spring plate 86a fixed on sleeve extension 84a integral in this embodiment with pinion 78a. This is rotatably and axially movable on the sleeve extension 76a. Hardened conical ring 90a is clamped to the end of sleeve 84a. The complementary hardened ring 92a is secured on the end of sleeve 76a. A ring 94a is positioned between the rings 90a and 92a and is adapted to be crowded between the opposed conical faces of rings 90a and 92a to force the parts 84a, 86a inward on the axle to engage the clutch 86a, 82a.

The operation of this clutch mechanism is controlled by column 64a (Figs. 8 and 9). The upper portion of this control column is identical with column 64 of Fig. 2. The yoke 62a is pivotally mounted on brackets 56a on plate 28a. The cables 58a connect the levers 102a with bell cranks 184 pivoted on the transverse strut 126a of yoke 62a. The other ends of the bell cranks 184 are adapted to engage a cam 130a on the lower end of the control shaft 57a. Side plates 186 over cam 130a form a channel to assure engagement of the cam with the bell crank.

The central shaft 57a is slidably and pivotally mounted in the yoke 62a in the manner shown in Fig. 2 so that either one, or both, of the bell cranks may be actuated to draw the cables 58a, the levers 102a and rotate eccentrics 180 against the tension of springs 108a. This rotation of eccentric 180 moves the wheel 37a rearward (to the right on Fig. 10) and thus relieves the radial pressure on ring 94a allowing clutch plate 86a to disengage by moving toward the end of shaft 32a.

As will be noted, this transverse movement of the ground wheels 37a will separate the pitch lines of the pinion gear and the ring gear, but this is not important since the pinion gear and its sleeve 84a will then be free to rotate about the sleeve 76a so that no driving load will be transmitted, and for the most part, not even relative movement, between the ring gear and pinion.

A straight upward or backward pull on the control column 64a will thus pull on both cables 58a to disengage their respective clutches and stop the driving of the ground wheels. Swinging the handle to one side engages cam 130a with only one bell crank 184 and disengages only one wheel as in the case shown in Figs. 1–7.

When the handle is released to allow the central column to return to its normal condition as shown in Figs. 8 and 9, spring 108a rotates the shaft 38b back to the position shown in Fig. 10 and pulls the inside of the wheel 37a against ring 94a wedging it between rings 90a and 92a until clutch plate 86a firmly engages plate 82a.

The adjustable mounting 159a for the caster 158a like the mounting 159 keeps the swivel axis of the caster substantially vertical in all positions of height adjustments. This mounting includes a parallelogram lever arrangement shown in Fig. 11. Twin lower levers 190 are secured to the adjusting lever 164a by sleeve shaft 191 telescoped on tie tube 22a and extending from approximately the center to one end thereof. Secured to the tie tube 22a at the end of shaft 191 is a fitting which extends back over the sleeve to a position between levers 190 and provides a stub arm 192 on which the upper link 194 is pivotally mounted. Both levers 190 and link 194 are pivotally secured to post 196 on the caster bearing 160a. Lever 164a carries thereon a spring detent pin 198 (see Figs. 8 and 12) which is adapted to selectively engage a series of holes 200 arcuately disposed in a bracket 202 fixed on tie tube 22a.

When detent 198 is pushed in to release it from hole 200 and hand lever 164a is pulled back, lever 190 is rotated so that it lifts against its pivot on 196. Thus the rear of the mower is lifted on the caster and the bed knife 33a is thus lifted to the desired height of cut. At the desired height, the pin 198 is released into its hole 200 to hold the adjustment assembly in the chosen position. Meanwhile, as frame 20a was swung up, stub arm 192 was rotated with it and pulled link 194 to compensate for the swinging of the arm 190 and thus to keep post 196 and caster bearing 160 vertical.

Although there are given above certain specific examples of this invention and its application in practical use and also certain modifications and alternatives, it should be understood that these are not intended to be exhaustive or limiting of the invention. On the contrary, these illustrations and the explanations herein are given in order to acquaint others skilled in the art with this invention and the principles thereof and a suitable manner of its application in practical use, so that others skilled in the art may be enabled to modify the invention and to adapt and apply it in numerous forms, each as may be best suited to the requirements of a particular use.

I claim:

1. In a power lawn mower of the type having a pair of ground wheels, cutter mechanism, a motor and driving connections from the motor to said wheels and cutter, the combination therewith of a power steering control mechanism comprising a single control column having a handle area rigidly held thereon near the upper end of said control column, said control column being mounted to swing both up and down in a plane perpendicular to the axis of the wheels and laterally to left and right with respect to said plane and for longitudinal movement along its own axis to be moved closer to and farther from the axis of the wheels, means in the driving connection to each wheel for varying its speed relative to that of the opposite wheel, means controlling said speed-varying means respectively, one connected to each side of the control column, and engaged by it when it is moved to that side from an intermediate position, whereby when the column is swung to one side one wheel is driven ahead of the other, when the control column is swung to the other side the other wheel is driven ahead and at the intermediate position equal drive is applied to both wheels.

2. The combination as defined in claim 1 wherein an automatic escapement mechanism is mounted on said control column and the mower frame and having two operative conditions to engage and disengage, respectively said column with said mower frame when said column is swung down substantially to a limit of free movement, a first lowering of said handle to said limit automatically placing said escapement mechanism in its first operative condition to engage said control column, whereby said mower may be lifted by said control column, a subsequent lowering of said handle to said limit automatically placing said escapement mechanism in its second operative condition to free said control column for up and down swinging movement.

3. The combination as defined in claim 2 wherein said escapement mechanism comprises a flipper pivotally mounted on the frame of said mower, a pin mounted on said flipper and extending laterally therefrom to engage a notch in a part on said control column, an escapement finger pivotally mounted on said column and urged toward a central position by a spring, whereby it will contact said flipper and push it out of engaging position when in its column-engaging position and to pivot it into engaging position when it is in its unengaged position.

4. In a power lawn mower of the type having a pair of ground wheels, cutter mechanism, a motor and driving connections from the motor to said wheels and cutter, the combination therewith of a power steering control mechanism comprising a single control column having a handle region rigidly integrally secured thereon near the upper end of said control column, said control column being mounted to swing both upwardly and downwardly in a plane perpendicular to the axis of the wheels and laterally to left and right with respect to said plane and for longitudinal movement along its own axis to move closer to and farther away from the wheels, a clutch operatively associated with each of said ground wheels, actuating means for said clutches, a pair of cam surfaces mounted on the lower end of said control column and facing laterally in opposite directions adapted to engage said actuating means, whereby when the column is swung to one side one wheel is driven ahead while the other is declutched and when the column is swung to the other side, the first-named wheel is declutched and the other is driven ahead.

5. The combination as defined in claim 4 which further comprises means for converting longitudinal movement of the control column into actuating movement of said actuating means of both clutches, whereby a longitudinal pull on said column disengages both clutches.

6. In a power lawn mower of the type having a pair of ground wheels, cutter mechanism, a motor and driving connections from the motor to said wheels and cutter, the combination therewith of a power steering control mechanism comprising a single control column having a handle portion integrally formed on the upper end thereof mounted to swing both in a plane perpendicular to the axis of the wheels and laterally with respect to said plane and for longitudinal movement along its own axis, a clutch operatively associated with each of said ground wheels, a pair of actuating means for said clutches, a pair of cam surfaces mounted on the lower end of said control column, push rods coupled to said actuating means and in operative engagement with said cams to be actuated thereby to disengage said clutches and hence to disengage said drive wheels from said motor means, selectively by direct pushing in accordance with the lateral movement of said control column and conjointly by cam action upon longitudinal movement of said column.

7. A power lawn mower of the rotary reel and power driven ground wheel type which comprises a rigid frame portion, a cutter mechanism rotatably mounted therein, a ground wheel frame portion pivoted on said rigid frame portion on an axis substantially spaced from the cutter mechanism in a fore and aft direction, a motor mount fixed to said rigid frame portion, a motor mounted thereon providing driving power for said mower, a pair of ground wheels mounted on said wheel frame portion, driving gear connections from said motor to the cutter mechanism and wheels respectively, said driving gear connection including a separate clutch for each of said ground wheels, a pair of levers pivotally mounted on said rigid frame and connected at one end thereof to said clutches, respectively, a pair of push rods respectively connected to the other ends of said levers and mounted on said rigid frame portion along an axis parallel to the axis of said wheels, a yoke pivotally mounted for movement about the axis of said push rods, a single control column for said clutches mounted for lateral swinging and longitudinal movement in said yoke, a pair of diverging cam surfaces mounted on the lower end of said control column between the free ends of said push rods, whereby longitudinal movement of said control column with respect to said yoke disengages both of said clutches to stop driving of said ground wheels and lateral swinging of the column in said yoke selectively disengages one of said clutches causing its wheel to lag behind the still driven opposite wheel to provide effective power steering for said lawn mower.

8. A power steering control mechanism for power lawn mowers comprising a drive linkage between the driving motor and each of the ground wheels, a clutch assembly interposed in each of said drive linkages, a control column for said mower adapted for substantially free movement in three directions with respect to the length of the column longitudinally thereof, vertically and laterally and actuating linkages operatively connecting said clutches to said control column and responsive to lateral and longitudinal movement of the column and unaffected by vertical movement, whereby longitudinal movement of said control column actuates said clutches simultaneously and lateral movement actuates one of said clutches selectively, while leaving said control column free for vertical movement at the convenience of the operator in traversing terrain.

9. A power steering control mechanism for power lawn mowers comprising a drive linkage between the driving motor and each of the ground wheels, a clutch assembly interposed in each of said drive linkages, a single integral handle for said mower mounted both for lateral movement and for swinging movement upwardly and downwardly for changing the altitude of the handle, and actuating linkages operatively connecting said clutches to said handle, whereby lateral movement of said handle actuates said clutches selectively, and said handle is free to swing up and down for the operator's convenience in resting his hands on the handle in traversing all kinds of terrain.

10. A device as defined in claim 9 wherein both drive linkages operate with the same drive ratio and said clutches are normally engaged to drive both ground wheels, whereby said mower will tend to travel in a straight line.

11. A power lawn mower as described in claim 7 wherein said yoke has mounted thereon a pair of cam surfaces adapted to engage said clutch levers and move them in a direction to disengage both of said clutches when said yoke is in its upper limit of pivotal movement.

12. In a power lawn mower of the type having a driving motor and a pair of driven ground wheels, a power steering control mechanism comprising in combination means for driving said ground wheels from said motor including a normally engaged clutch for each ground wheel, control levers for said clutches, a yoke mounted for pivotal movement about an axis parallel to the axis of said ground wheels, a control column mounted in said yoke for pivotal movement transversely of said yoke movement and for longitudinal movement therein with one end in operative relationship with said control levers, and a pair of cams positioned on said control column to engage said levers whereby said normally engaged clutches are disengaged simultaneously by said cams upon longitudnal movement of said control column in said yoke and selectively by direct engagement therewith upon pivotal movement of said control column in said yoke.

13. In a power lawn mower of the type having a driving motor and driven cutter mechanism and ground wheels, a power steering mechanism comprising a drive linkage between said driving motor and each of the ground wheels, a clutch interposed in each of said drive linkages comprising a pair of friction plate elements at least one being mounted for movement along its longitudinal axis, a cam member for axially moving said movable plate, a control column for said mower adapted for swinging movement in a plane normal to the axis of the ground wheels and laterally with respect to said plane and means for actuating said cam members respectively to operate said clutches by lateral movement of said control column, while independent of swinging movement of the handle in said plane normal to the axis of the ground wheels.

14. A device as described in claim 13 wherein said cutter mechnaism is a driven reel and said ground wheels have a cylindrical rim portion and wherein said clutches comprise a first friction plate fixed to the reel axle of said lawn mower, a second friction plate rotatably mounted on said reel axle for longitudianl movement therealong, a collar fixed to said reel axle adjacent but spaced from the hub of said plate to form a V shaped annular recess therebetween, a V-shaped ring of a diameter slightly greater than said annular recess mounted therein, a movable bearing support for said ground wheels and a lever for moving said bearing support to bring the inner surface of the wheel rim into engagement with said V ring to forces it into said annular recess to thereby engage said clutch and drive said ground wheels by moving said second friction plate longitudinally along said reel axis.

15. A device as described in claim 13 wherein said cutter mechanism is a driven reel and said clutches comprise a first clutch plate operatively connected to said ground wheel, a second clutch plate slidably keyed to the reel shaft and having on its hub a bearing ring, a second bearing ring fixed to the reel shaft to form with said first ring an outwardly diverging annular recess, a plurality of ball bearings disposed in said recess, a cylindrical collar surrounding said ball bearings and holding them in said recess, a cam surface on the inner face of said collar, and lever means for moving said collar longitudinally along said reel axis to force said ball bearings into said recess to move said second clutch plate into engagement with said first clutch plate.

16. In a power lawn mower of the type having a pair of ground wheels, a rotary reel carrying a plurality of fly knives, and a motor for driving said wheels and reel; a power steering control mechanism comprising a single control column mounted for pivotal movement about a first axis parallel to said reel axis and laterally and also longitudinally along its own axis; drive transmitting means connecting said motor to each of said ground wheels; a clutch assembly operatively interposed in each of said drive transmitting means; a separate axle for each ground wheel of said pair; and actuating means for each of said clutches, including an eccentric rotatable mounting for each of said axles, a lever connected to each of said mountings for adjusting its eccentric, a pair of cam surfaces mounted on the lower end of said control column, a bell crank operatively associated with each of said cam surfaces, and a flexible cable connecting said levers and said bell cranks whereby movement of said control column controls the driving of said ground wheels selectively and jointly in accordance with the lateral movement of said control column and its longitudinal movement along its own axis, respectively.

17. A power steering control mechanism for power lawn mowers including a carriage, a drive linkage between the driving motor and two of the ground wheels on left and right sides of the mower, respectively, a controllable clutch assembly interposed in each of said drive linkages, a single control handle universally mounted on said carriage, said handle being swingable in an arc upwardly and downwardly between first predetermined limits in a plane perpendicular to the wheel axes and being movable laterally to left and right with respect to the direction of mower advance between second predetermined limits and being reciprocally mounted for movement generally forwardly in the direction of mower advance and backwardly between third predetermined limits, and clutch control mechanism responsive to reciprocation of the handle forward to one of said third limits for engaging both clutch assemblies, said mechanism responsive to reciprocation of the handle back to the other of said third limits for disengaging both clutches, said clutch control mechanism being independent of swinging movement of the handle upwardly and downwardly, said clutch control mechanism being responsive to lateral movement of the handle to the left to increase the relative driving force applied from the motor to the left of said wheels and said clutch control mechanism being responsive to lateral movement of the handle to the right to increase the relative driving force applied from the motor to the right of said wheels.

18. A power steering control mechanism for power lawn mowers comprising a drive linkage between the driving motor and left and right ground wheels, a clutch assembly interposed in each of said drive linkages, a yoke structure swingably coupled to the mower for swinging movement up and down between predetermined upper and lower limits about an axis transverse to the direction of advance of the mower, a rigid handle movably secured to said yoke structure and movable in two directions with respect to said yoke structure, said handle being movable laterally to right and left between right and left predetermined limits with respect to said yoke structure, said handle being movable in a direction forwardly and rearwardly between front and rear predetermined limits with respect to said yoke structure, clutch-actuating control means on said mower closely adjacent to the swinging axis of said yoke structure and non-responsive to swinging motion thereof between said upper and lower limits, said clutch-actuating control means being selectively responsive to lateral movement of the handle toward the right limit with respect to said yoke structure to increase the relative driving power applied to the right ground wheel to turn the mower to the left and being selectively responsive to lateral movement of the handle to the left with respect to said yoke structure to increase the relative driving power applied to the left ground wheel to turn the mower to the right, said clutch actuating means being responsive to forward movement of the handle toward said forward limit with respect to said yoke structure for increasing the relative driving power applied to both ground wheels and being responsive to rearward movement of the handle with respect to said yoke structure for decreasing the total driving power applied to both ground wheels, whereby the operator is free to swing the handle up and down as convenient in traversing the ground and power steering of the mower in response to the natural motions of the handle is provided.

19. Power steering mechanism for power lawn mowers as claimed in claim 18 and including clutch disengaging means responsive to swinging of the yoke structure into its upper limit position for disengaging both of said clutches.

References Cited in the file of this patent

UNITED STATES PATENTS

| | | |
|---|---|---|
| 980,817 | Moore | Jan. 3, 1911 |
| 1,734,718 | Donald | Nov. 5, 1929 |
| 1,745,832 | Brown | Feb. 4, 1930 |
| 1,779,583 | Blydenburgh | Oct. 28, 1930 |
| 2,329,372 | Hitch | Sept. 14, 1943 |
| 2,508,060 | Dalglich | May 16, 1950 |
| 2,548,721 | Grobowski | Apr. 10, 1951 |
| 2,658,322 | Sullivan | Nov. 10, 1953 |

FOREIGN PATENTS

| | | |
|---|---|---|
| 534,504 | France | Jan. 7, 1922 |